United States Patent [19]

Sledmere

[11] Patent Number: 4,512,190
[45] Date of Patent: Apr. 23, 1985

[54] MAGNETICALLY OPERATED LIQUID LEVEL INDICATOR

[75] Inventor: Alan B. Sledmere, Dartford, England

[73] Assignee: Klinger AG, Zug, Switzerland

[21] Appl. No.: 366,763

[22] Filed: Apr. 8, 1982

[30] Foreign Application Priority Data

Apr. 14, 1981 [GB] United Kingdom ............... 8111798

[51] Int. Cl.³ ............................................. G01F 23/12
[52] U.S. Cl. ........................................ 73/319; 73/314;
73/322.5; 73/DIG. 5; 335/302; 335/306
[58] Field of Search ............... 116/204, 228, DIG. 41;
73/314, 319, 322.5, DIG. 5; 335/229, 302, 306,
205, 272; 200/84 C

[56]  References Cited

U.S. PATENT DOCUMENTS

| | | | |
|---|---|---|---|
| 2,409,866 | 10/1946 | Jewell | 335/272 X |
| 2,920,484 | 1/1960 | Reichert | 73/319 |
| 3,022,450 | 2/1962 | Chase, Jr. | 335/229 X |
| 3,024,392 | 3/1962 | Baermann | 335/306 X |
| 3,233,950 | 2/1966 | Baermann | 335/306 X |
| 3,349,354 | 10/1967 | Miyata | 335/306 X |
| 3,361,999 | 1/1968 | Leinauer et al. | 335/205 X |
| 3,420,103 | 1/1969 | Peschek | 73/319 |
| 4,382,245 | 5/1983 | Harrigan | 335/306 |
| 4,457,171 | 7/1984 | Gebauer | 73/319 X |

FOREIGN PATENT DOCUMENTS

| | | | |
|---|---|---|---|
| 479104 | 12/1951 | Canada | 335/306 |
| 969404 | 7/1949 | Fed. Rep. of Germany | 335/306 |
| 1085341 | 12/1957 | Fed. Rep. of Germany | 73/319 |
| 969753 | 7/1958 | Fed. Rep. of Germany | 73/319 |
| 2146514 | 3/1972 | Fed. Rep. of Germany | 335/302 |

Primary Examiner—Gerald Goldberg
Assistant Examiner—Tom Noland
Attorney, Agent, or Firm—Abelman Frayne Rezac & Schwab

[57]  ABSTRACT

A liquid level indicator includes a magnetized float and a plurality of magnetized indicator elements which are pivoted by the float magnet and which have distinguishable opposite surfaces to provide the liquid level indication, the indicator elements being formed from a material which provides magnetic fields of opposite magnetic polarity which extend substantially continuously along the opposite edges of the indicator elements.

3 Claims, 12 Drawing Figures

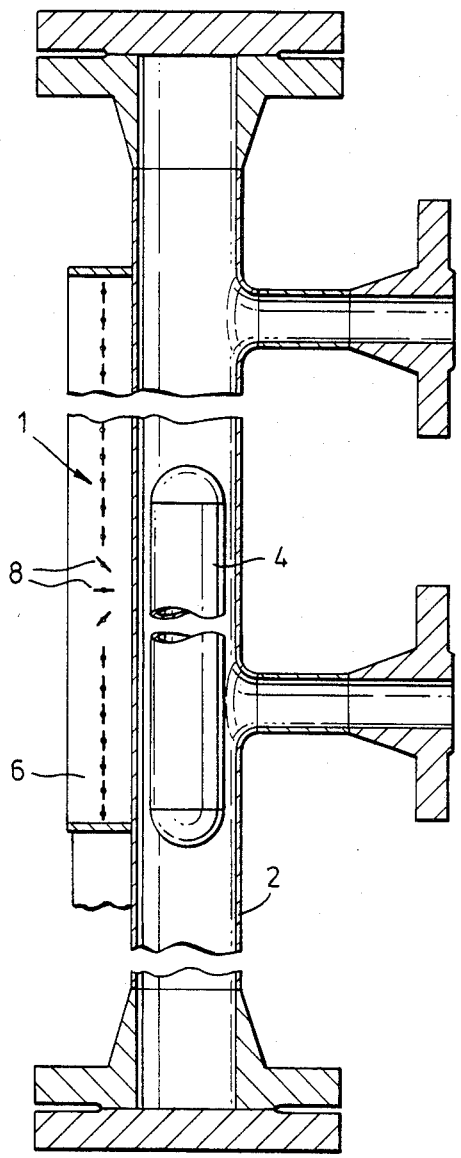
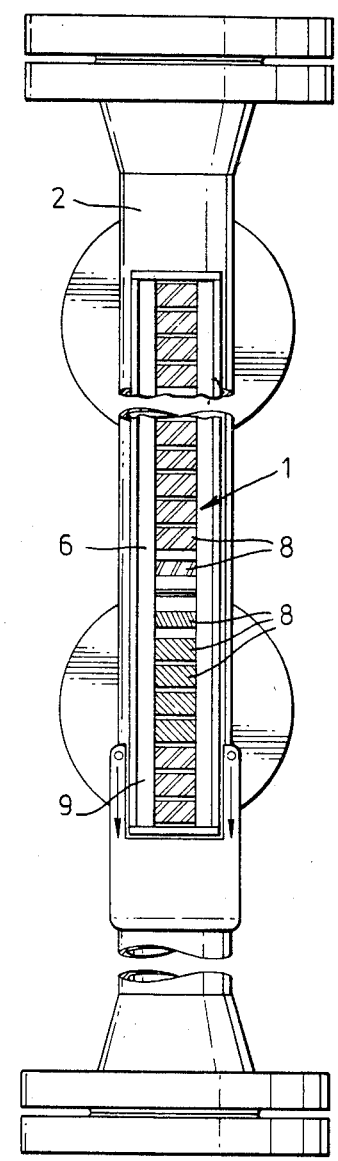
Fig. 1.
Fig. 2.

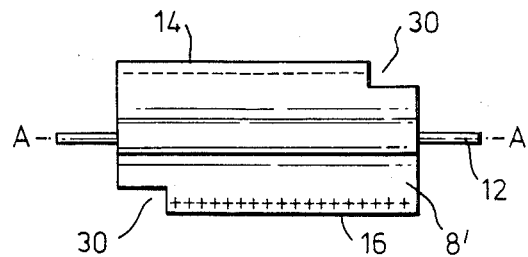
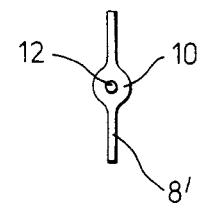
Fig. 3a.        Fig. 3b.
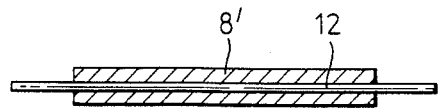
Fig. 3c.
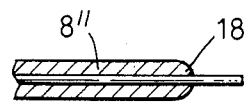    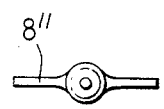
Fig. 4a.        Fig. 4b.
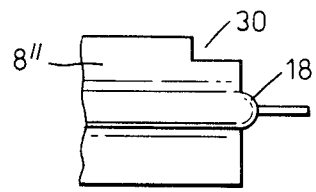
Fig. 4c.
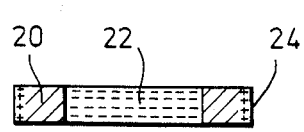    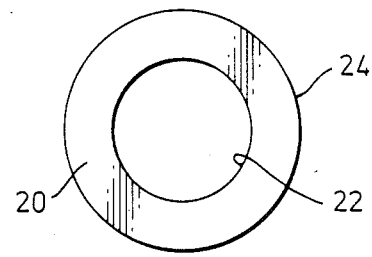
Fig. 5a.        Fig. 5b.

MAGNETICALLY OPERATED LIQUID LEVEL INDICATOR

FIELD OF THE INVENTION

This invention relates to magnetically operated liquid level indicators of the kind having a magnetized float which moves as the level of liquid changes, and having a plurality of magnetized indicator elements disposed one above the other and past which the magnetized float travels as the liquid level raises or falls, the indicator elements being rotatable under the influence of the magnetized float.

BACKGROUND OF THE INVENTION

Such magnetically operated liquid level indicators are disclosed in U.S. Pat. No. 3,964,312 and G.B. No. 2028505A, and include magnetized indicator elements which are differently colored on opposite faces thereof, and which are housed in a display box disposed in front of the liquid containing vessel. As the magnetized float moves past the magnetized indicator elements, they are rotated in sequence so that those elements which are disposed below the liquid level present one color to the viewer, while those elements which are above the liquid level present the other color. Such indicators have the advantage that there is no mechanical connection between the magnetized float (which may be in a pressurized container) and the magnetized indicator elements (which may be in a display box situated in the atmosphere). This is a particular advantage when handling hazardous fluids since it substantially reduces the possibility of escape of the fluid from the device. However, the magnetized elements of the known indicators (which are made of, for example, pressed steel) only provide a weak magnetic field which is unevenly distributed along their lengths. This is because the magnetic field is distributed such that polarization occurs only at corner regions of the elements and the end regions only of each element behave as a respective pair of parallel weak magnets which have respective like poles disposed at the corner edges, and spaced apart from each other. This tends to produce a rather, weak, unstable magnetic field, and the elements tend to be positionally unstable and readily subject to outside influences such as vibrations or external magnetic fields. Furthermore, there is a possibility that some of the indicator elements may not remain in their set position after the magnetized float has passed them.

Attempts have been made to increase the magnetic field of indicator elements by bonding bar magnets to them, but this provides a rather cumbersome construction.

Both in conventional magnetically operated liquid level indicators, and in indicators embodying the present invention, as later described, the magnetized float may take the form of a bar magnet having a central iron ring to concentrate the magnetic field (see for example GB No. 2028505A). Each end of the bar magnet has a polarity opposite to that of the ring, and it is intended that only the magnetic field of the ring rotates the magnetic indicator elements to the exclusion of the magnetic field of the longitudinal ends of the bar magnet. When using such a float, stops are usually provided for the indicator elements to prevent them from being rotated past their desired position by the magnetic field of the longitudinal ends of the bar magnet.

SUMMARY OF THE INVENTION

According to the present invention, a magnetically operated liquid level indicator includes a magnetized float and magnetized indicator elements actuated thereby, in which a stable magnetic field gives rapid and positive rotation of the indicator elements, the indicator elements remaining in position after rotation through 180°. The indicator elements are not readily disturbed inadvertently by outside influences from their set position. In a preferred liquid level indicator in accordance with the present invention a magnetized float is employed in the absence of stops on the indicator elements for preventing excessive rotation thereof by the magnetic field of the float, and without the need to provide a close balance between the magnetic field strengths of float magnet and indicator element magnets.

The invention provides a magnetically operated liquid level indicator including a magnetized float which is moved in unison with movements of the liquid level and which moves a plurality of elongate magnetized indicator elements as the magnetized float travels as the liquid level rises or falls. The magnetized indicator elements each have a pair of opposed longitudinal ends, a generally horizontal axis, and opposed regions each extending from one said longitudinal end to the other, the respective indicator elements each being arranged one above the other and being pivotable about their respective horizontal axes under the influence of the magnetic field of the float when the float lies adjacent thereto so as to provide said liquid level indication. The magnetized elements are each formed of a material which has a magnetic field selected so that it extends substantially completely along those opposed regions of the said elongate elements and one of the said regions has a polarity opposite from that of the other. The adjacent regions of opposite magnetic polarity are attracted to each other, and thereby provide a stable magnetic field.

By selecting a magnetic material for the indicator elements which can provide the magnetic field geometry described above, it is possible to provide each indicator element with a more stable and stroner magnetic field relative to its rotational inertia as compared with conventional magnetic indicator elements formed of, for example, pressed steel (which, it is found, can only be magetized to provide a relatively weak and unstable magnetic field localized at corners of opposed longitudinal ends). As later described, the indicator elements are constructed from a lightweight material which provides a particularly strong magnetic field relative to their rotational inertia.

In a magnetically operated liquid level indicator in accordance with the present invention, the magnetized indicator elements are disposed one above the other and are pivotable so as to rotate as the magnetized float passes them. The top and bottom portions of an adjacent pair of indicator elements that are not under the influence of the magnetic field of the float will therefore provide adjacent regions (the lowermost region of the upper element and the uppermost region of the lower element) which are of opposite, strong polarity along their entire respective lengths, and which are strongly attracted towards one another and thereby securely held against unintended movement.

When the elongate indicator elements are actuated by the magnetic field of the float, they provide an efficient, positive and rapid rotation, this being due to their strong magnetic field relative to their rotational inertia.

In a preferred liquid level indicator in accordance with the present invention, the elongate magnetized indicator elements are each plate-like elements having opposed longitudinal edges, which edges are each disposed generally horizontally, the plate-like elements being arranged in a generally vertical plane. When the magnetized float is remote from the said plate-like elements, the said opposed longitudinal edges defining the said opposed regions of respective said plate-like elements lie in the said vertical plane. Such plate-like indicator elements may assume a substantially continuous disposition of their outwardly presented faces to present a continuous colored face above the float, and a continuous face of a different color below said float.

Materials which can be magnetized so as to selectively magnetically polarize complete opposed regions of elongate indicator elements made therefrom are, for example, particulate magnetic materials such as ferritic materials distributed within a non-magnetic carrier material, or sintered magnetic materials, for example, those made by sintering and compressing particulate magnetic materials such as ferritic materials (by which is meant any magnetic material containing iron oxide(s) as a major component, and optionally containing other metallic oxides and carbonates of, for example, rare earth metals).

Particularly preferred elongate indicator elements of a liquid level indicator in accordance with the present invention are made from a particulate magnetic material, such as ferritic material, distributed within a synthetic plastics material, it being possible to mold such a composition into a thin, lightweight wafer of a neat, simple and elegant construction. An especially preferred wafer is manufactured by molding, for example by injection molding, a mixture of powdered ferritic material and molten thermoplastic material, for example, nylon. Material so molded is hereinafter referred to as "molded ferrite".

The elongate indicator elements are magnetized in such a manner as to provide selective and opposite polarization of those entire respective opposed longitudinal regions which are to be disposed generally horizontally upon assembly of the liquid level indicator. The strength of the magnetic field provided depends upon that of the float and vice versa. The magnetic field strength of the indicator elements should be sufficiently strong to provide the positive rotation referred to above, but not so strong that the magnetic field of the float fails to actuate the indicator elements. In other words the relative magnetic field strengths of indicator elements and float should be such that the indicator element-disturbing force provided by the float is greater than the magnetic linkage force between adjacent indicator elements.

Although, for a liquid level indicator in accordance with the present invention it is still necessary to achieve a correct balance between the magnetic field strengths of float and indicator elements, this balance may be more easily achieved than for conventional indicators, this being because of the more stable positioning of the indicator elements of an indicator in accordance with the present invention as compared with the positioning of those of a conventional liquid level indicator.

A particularly neat, simple and elegant indicator element construction is obtained if a wafer of a particulate magnetic material distributed within a non-magnetic carrier material is molded around a pivot wire placed in the mold to provide a one-piece unit including wafer and pivot wire. Such wafers are particularly easy and economical to manufacture.

The float magnet may be a conventional, vertically disposed bar magnet preferably, as described above, with an iron ring to concentrate the magnetic field into a desired narrow area. However, this arrangement tends to be rather bulky and furthermore, when using such float magnets, the tendency for the poles at the longitudinal ends of the bar magnet to actuate the indicator elements and cause them to rotate past their vertical position cannot always be overcome. Hence, it at least desirable when using such floats magnets to provide stops on the indicator elements, this in turn making them rather more bulky and less simple to manufacture.

The above difficulty may be overcome by employing as a float magnet a ring magnet of annular section provided with a magnetic field geometry such that the outer circumferential periphery is magnetized along its continuous surface and is of a single polarity. Such float magnets are less bulky and more effective and can provide a powerful magnetic field concentrated over the required narrow area. Indeed the field may be so well concentrated that it is unnecessary to provide stops on the indicator elements, this enabling a magnetic indicator element of a more simple and less bulky construction to be employed.

The annular section ring magnet may be of any material which can be provided with a magnetic field of the geometry described above and is preferably of a sintered magnetic material such as ferritic material. A convenient method of manufacture is to sinter and compress magnetic particulate material into the desired annular section ring shape. The desired magnetic field geometry may be provided by preorienting the particles magnetically prior to compression and sintering. A particularly lightweight construction is a ring magnet made from sintered and compressed magnetic particles. Such rings tend to have a glazed, ceramic appearance and are hereinafter called "ceramic magnets".

DESCRIPTION OF THE PREFERRED EMBODIMENTS

Embodiments of the present invention will now be described in more detail with reference to the accompanying drawings, in which:

FIG. 1 shows a sectional side elevation of a liquid level indicator in accordance with the invention, with part broken away;

FIG. 2 is a front elevation of the indicator of FIG. 1, with part broken away;

FIGS. 3a and 3b are enlarged front and side elevations respectively of one form of wafer which can be used as an indicator element in the indicator of FIG. 1;

FIG. 3c shows a cross-section along the line A—A of FIG. 3a;

FIGS. 4a, 4b and 4c show a wafer construction alternative to that of FIGS. 3a–3c, FIG. 4a showing a longitudinal section (part broken away), FIG. 4b showing a side elevation, and FIG. 4c showing a front view (part broken away);

FIGS. 5a and 5b show a radial cross-section and plan view respectively of one form of magnet which can be incorporated in a float of the indicator of FIG. 1;

Figure 6:
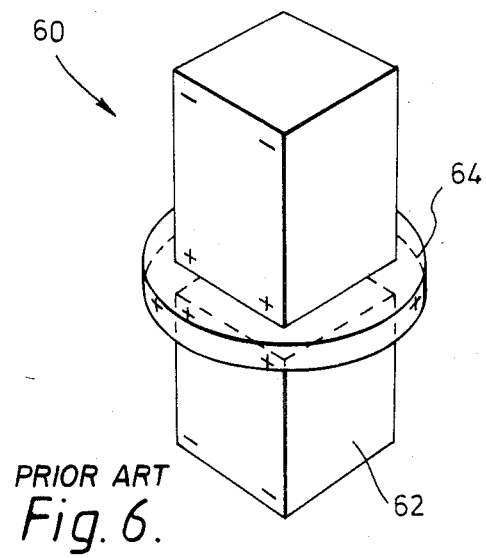
FIG. 6 illustrates an alternative form of magnet which can be incorporated in a float of the indicator of FIG. 1, namely a known bar magnet having a central iron ring.

Referring firstly to FIGS. 1 and 2, these show a liquid level indicator generally indicated as 1, for indicating the level of liquid in a housing 2. The indicator 1 includes a stainless steel float 4 (FIG. 1) capable of moving as the liquid level moves up or down in the housing 2 and which carries a permanent magnet 60, for example a conventional, vertically disposed, bar magnet 62 with complementary central poles and an iron ring 64 to concentrate the field to the desired narrow area (see FIG. 6), or a ring magnet described with more detail later with reference to FIGS. 5a and 5b. The indicator 1 also includes a display box 6, across which extends a plurality of horizontally disposed wires (omitted from FIGS. 1 and 2 for clarity but shown in FIGS. 3 and 4), these wires being vertically spaced apart one above the other. Each wire carries a wafer 8, preferred constructions of which are described below with reference to FIGS. 3 and 4. The wafers 8 are either capable of rotating about the respective wires through 180°, or, in an alternative and preferred embodiment (see FIG. 7), each respective wafer and wire is formed as a one-piece unit, and the opposite ends of the wire are rotatably supported in apertures 50 provided in opposite sides 52 of the display box 6. Wafers of this latter construction are particularly simple and economic to manufacture. The opposite surfaces of each wafer are of different color (for example, one surface may be red and the other silver). This is indicated by the shading of the wafers in FIG. 2.

As the liquid rises or falls in the housing 2, the float 4 rises or falls with the liquid. The magnetized wafers are sequentially subjected to the magnetic field of the permanent magnet in the float 4, and are thereby rotated through 180° so that wafers 8 below the liquid level present a face having one of the two colors while wafers above the liquid level present a face having the other of the two colors. This gives a readily observable indication of liquid level to the viewer, as can be seen from FIG. 2.

Conveniently, the display box 6 may extend to a region 9 below the lowest level to which liquid would descend (see FIG. 2). The wafers in that region would normally never be acted upon by the magnetized float. If, however, the float became damaged (e.g. punctured or collapsed) it would sink and rotate the wafer through 180° giving a readily visible indication to the viewer that the float had sunk.

Referring now to FIGS. 3a-3c, these show one form of wafer 8' which is generally planar but which has a central, generally cylindrical part 10 through which a wire 12 passes, the wafer 8' being freely rotatable about wire 12. Opposed longitudinal edges 14, 16 run between opposed longitudinal ends of the wafer. The wafer 8' is constructed from injection molded ferrite and is provided with a much stronger magnetic field relative to its rotational inertia than conventional plates. Furthermore, the magnetic polarization is such that the complete top longitudinal edge 14 is provided with a magnetic field of one polarity and the complete bottom longitudinal edge 16 is provided with a magnetic field of the opposite polarity. Adjacent wafers 8' that are remote from the permanent magnet of the float 4 therefore provide respective juxtaposed surfaces of opposite and strong magnetic polarity. The opposite poles of the wafers 8' are strongly attracted towards one another, and are thus securely held in their vertical position to present a continuous vertical surface to the viewer.

This is an extremely stable configuration, and the wafers 8' do not tend to move out of this vertical alignment until acted upon by the magnetized float. When the liquid level changes and the permanent magnet of the float rotates a particular wafer 8', rotation of the wafer through 180° occurs. Owing to the strong, stable magnetic field of the wafers, a rapid and positive flip-over of the wafers is achieved, and the wafers are stable to outside influences such as vibrations or external magnetic fields. In the event that stops are provided to limit rotation of the wafers to 180°, as is desirable when using a float having a bar magnet with a central iron ring, then, one corner at each end of the wafers 8' is cut away as shown at 30 in FIG. 3a to permit the wafer to pass over one of the stops during its rotation from one vertical position to the other. However, in preferred constructions of liquid level indicator in accordance with the invention a float is chosen which renders it unnecessary to fit such stops. This simplifies the design as compared with conventional liquid livel indicators. The wafers 8' are of extremely light-weight construction and may be very small. They are, however, somewhat thicker than conventional plates since this enables a stronger magnetic field to be applied.

Their design may be of a more elegant and even simpler construction than that shown in FIGS. 3a-3c. The wafers 8' of FIGS. 3a-3c are generally fitted with washers at the opposite axial ends of the cylindrical part 10 where the wire 12 emerges (though these washers are omitted from FIGS. 3a-3c for clarity). However, these washers may be dispensed with if the wafers are provided with rounded edges 18 (see wafers 8" of FIGS. 4a-4c).

Figure 7:
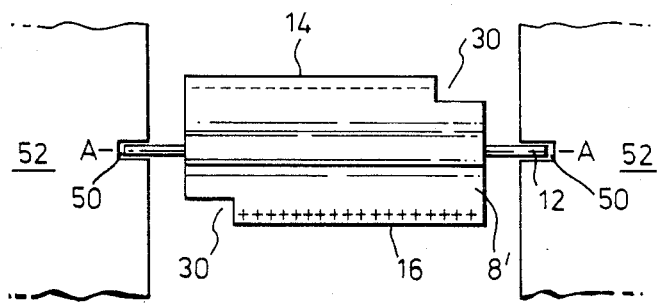
FIG. 7 illustrates the manner in which the indicator elements may be pivotally supported.

In a still more elegant and simple construction, the wafer 8 or 8' and pivot wire 12 are formed as a one-piece unit and apertures 50 are provided in opposite sides 52 of the display box 6, within which opposite ends of the wires rotate (see FIG. 7). The one-piece unit may be formed by molding the mixture of ferrite and non-magnetic material around the wire supported in the mold.

One form of permanent magnet which can be incorporated in float 4 is the annular section ceramic ring magnet 20 shown in FIGS. 5a and 5b. The ring magnet 20 is conveniently housed within a buoyant protective sheath of non-magnetic material such as stainless steel or plastics material. When the sheath floats the longitudinal axis of the ring magnet is disposed essentially vertically so that the outer circumferential surface 24 faces the wafers 8 or 8'.

Typically, the ring magnet 20 is manufactured from a sintered ferritic material and is magnetically polarized such that the continuous outer circumferential surface 24 is of a single magnetic polarity. This is a simple, lightweight construction which provides a powerful magnetic field with concentration of the magnetic field over the desired narrow area and allows the stops to be omitted from the wafer 8 or 8' as described above. Because of this special magnetic field geometry the effect of the annular section ceramic ring magnet 20 is omnidirectional in a radial sense. In other words, any portion of the outer circumferential surface 24 may be allowed to face the wafers 8 or 8' to achieve the same desired effect, and hence it is unnecessary to guide the ring to prevent it from rotation about its longitudinal axis. The polarity of the inner circumferential surface 22 is usually of a polarity opposite to that of the outer circumferential surface 24.

As an alternative to the above mentioned annular section ring magnet 20, the permanent magnet of the float may be a conventional, essentially vertically disposed, bar magnet with complementary central poles and an iron ring to concentrate the field into the desired area. Again this is conveniently housed within a protective buoyant sheath as described with reference to ring magnet 20. When using a bar magnet with a central iron ring as the permanent magnet of the float it is preferred to fit stops on the wafers 8 or 8′ to prevent the wafers from being undesirably rotated past their 180° position by the magnetic fields of the ends of the bar magnet.

Without regard to the form of float magnet chosen, it is desirable to achieve within limits the correct balance between the relative strengths of the magnetic fields of the float magnet and display wafers respectively. This balance is more readily achieved for liquid level indicators in accordance with the present invention as compared with conventional indicators, this being because of the more stable attitude of the wafers provided by their special magnetic field geometry. Because of this it is possible sometimes in an indicator embodying the invention, to omit the stops even when using a bar magnet with an iron ring as the float magnet, provided that a delicate balance between the relative magnetic strenghts of float and wafers is achieved and provided that the conditions, e.g. temperature, are not likely to vary too greatly. However, as explained above, for such a float magnet it is preferred to employ stops for the wafers.

I claim:

1. In a liquid level indicator including a magnetized float capable of moving as the liquid level moves;
    a plurality of adjacent magnetized indicator elements disposed one above the other past which the float travels as the liquid level rises or falls, and,
    support members for the indicator elements,
    the indicator elements each being plate-like elements having a pair of opposed ends, a generally longitudinal axis and opposed longitudinal edges each extending from one of said pair of opposed ends to the other,
    the indicator elements each being pivotable about its said horizontal axis under the action of the magnetic float when the float lies adjacent thereto so as to provide said liquid level indication,
    the support members each being disposed adjacent to a respective said end of the indicator elements, and the indicator elements and support members being adapted for cooperation with one another to allow said pivotable movement of the indicator elements,
    the improvement comprising:
    each said indicator element being formed from a dimensionally stable collocation of magnetic particles which have been magnetized to provide a magnetic field of one polarity and of substantially constant flux density extending continuously along one longitudinal edge thereof, and a magnetic field of an opposite polarity and of substantially constant flux density extending continuously along the other longitudinal edge thereof, the adjacent edges of adjacent pairs of elements being of opposite polarity and mutually attracting except when they are in the immediate vicinity of said magnetized float; and,
    said magnetized float including a magnetized disk having an outer circumferential periphery thereof providing a single continuous magnetic pole of a single polarity and which is supported by said float with the axis of said magnetized disk vertically disposed;
    said magnetized disk presenting to said slats a magnetic field that is substantially constant in magnitude throughout its entire periphery without regard to the position of angular rotation of said magnet about said vertical longitudinal axis.

2. The liquid level indicator of claim 1, in which said magnetized disk of said float is operatively associated with bar magnets having poles of like polarity positioned in contact with a central portion of said disk.

3. The liquid level indicator of claim 1, in which said magnetized disk is an annular disk providing a ring-shaped magnet, said ring-shaped magnet being supported by said float with the central longitudinal axis thereof aligned with the central longitudinal axis of said float.

* * * * *